Figure 1:
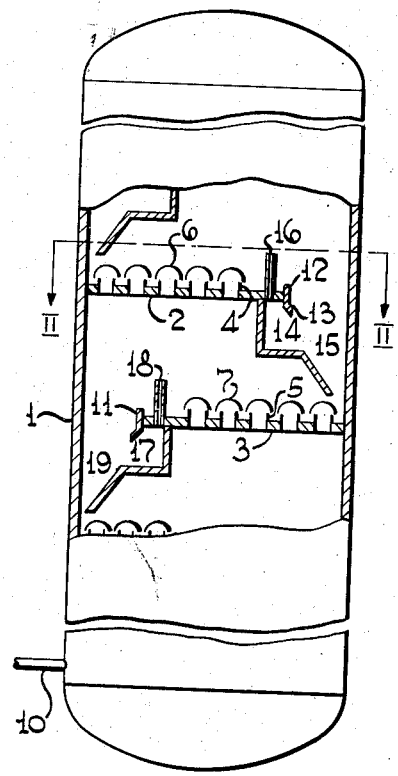

July 27, 1954     H. C. NORTH ET AL     2,684,837
APPARATUS FOR OPERATING A VAPOR LIQUID CONTACTING ZONE
Filed Jan. 23, 1951

Howard C. North
Maynard S. Northup    Inventors
By W. O. T Heilman   Attorney

Patented July 27, 1954

2,684,837

UNITED STATES PATENT OFFICE 2,684,837

APPARATUS FOR OPERATING A VAPOR LIQUID CONTACTING ZONE

Howard C. North, Westfield, and Maynard S. Northup, Roselle Park, N. J., assignors to Standard Oil Development Company, a corporation of Delaware Application January 23, 1951, Serial No. 208,046

5 Claims. (Cl. 261—114)

The present invention is concerned with an improved method and apparatus for operating a countercurrent vapor-liquid treating zone. The invention is more particularly concerned with an improved fractionation zone and is particularly directed to a method of contacting upflowing vapor and downflowing liquid utilizing bubble caps, or equivalent trays, and downcomers wherein the liquid flows downwardly from one tray to a succeeding tray. In accordance with the present invention the capacity of a tray and the entire treating zone is markedly increased by providing a method of efficiently and readily separating entrained vapor from the downflowing liquid in the downcomer. In accordance with the present invention a disengaging zone is provided in the downcomer for segregating the vapor from the liquid and means are provided for passing the segregated vapor to a point in the treating zone above the height of the liquid on the tray.

It is well known in the art to carry out many chemical reactions and separations wherein vapor and liquid are contacted in a countercurrent manner, such as in a hydrocarbon fractionation zone. Normally the liquid passes from one zone to a lower zone by means of downcomers or their equivalent while the vapors pass upwardly from zone to zone through chimneys in the tray, around various types of bell caps into the liquid phase disposed on the top of the tray. The liquid phase passes from zone to zone over weirs on the respective trays into downcomers and passes onto the tray in the zone below. The height of the liquid phase on the tray is determined by the height of the weir. The downcomer from the zone above must of necessity extend below the top of the liquid phase on the tray.

In liquid-gas contacting operations of this character, the capacity of the tray to a large extent is determined by the degree to which separation can be effected of entrained vapors carried into the downcomer by the downflowing liquid. If satisfactory separation is not secured, the density of the liquid in the downcomer decreases resulting in flooding of the downcomer and also of the tray above. Furthermore, the downcomer cannot be made unduly large since increasing the area of the downcomer must of necessity decrease the number of bell caps which can be utilized on any one particular tray. Thus, it is evident that the overall capacity of a countercurrent vapor-liquid system must of necessity depend upon the efficiency of the downcomers along with other factors, such as number of bell caps, bell cap size, slot size and the like.

In accordance with the present invention, the efficiency of a downcomer is markedly increased by providing a disengaging zone comprising an integral part of the downcomer immediately below the plate from which the liquid phase flows. The segregated vapor is then passed to a point above the liquid level on the plate from which the liquid flowed.

Figure 2:
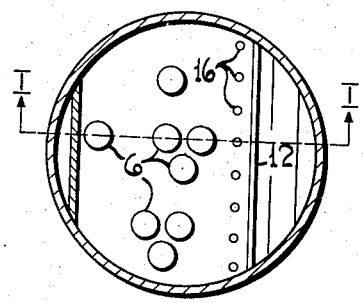
Figure 3:
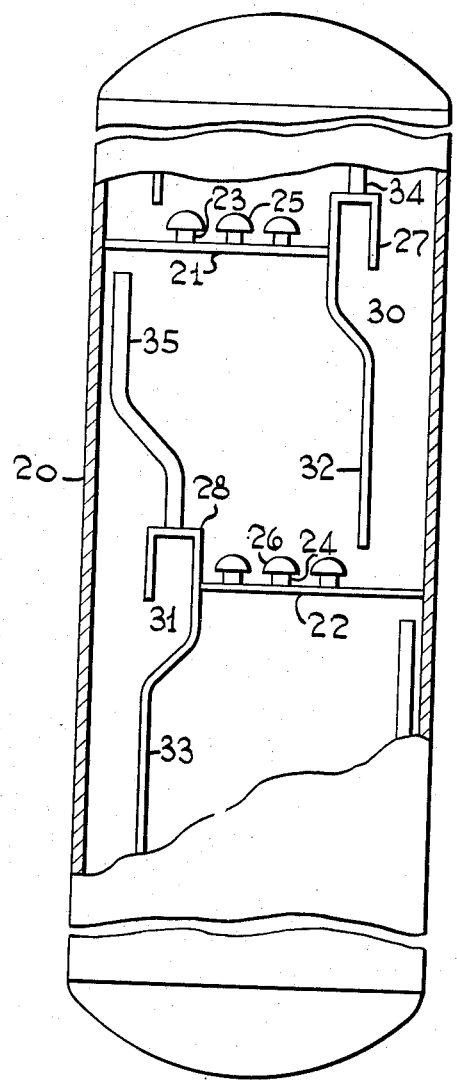

The present invention may be readily understood by reference to the drawings illustrating embodiments of the same. Figure 1 shows two plates or zones in a countercurrent treating zone employing the improved downcomers in accordance with the present invention. Figure 2 illustrates a top view of one plate. Figure 3 is a further illustration of the disengaging zone of the present invention wherein a quieting zone is provided.

Referring specifically to Figure 1, fractionating zone 1 is illustrated showing bubble cap trays 2 and 3. It is to be understood that any number of trays may be utilized in fractionating zone 1. Trays 2 and 3 contain chimneys 4 and 5 respectively, as well as, bubble caps 6 and 7. In accordance with the present invention, for the purpose of description, it is assumed that a vaporous feed is introduced at a lower point of fractionating zone 1 by means of line 10. Temperatures and pressures are adjusted so that vapors flow upwardly in zone 10 through the chimneys 5 on plate 3 and around bubble cap 7 into a liquid maintained on the top of plate 3, the height of which is determined by weir 11. The liquid phase on plate 3 comprises dissolved or condensed constituents of the vaporous feed introduced by means of line 10. Vapors flow through the liquid phase on the top of plate 3 into the zone below plate 2; through the chimneys 4 and around bell caps 6 into a liquid disposed on the top of plate 2, the height of which is determined by weir 12. In accordance with the present invention the liquid phase flows over weir 12 along a sloped segment 13 of the downcomer. The liquid phase falls freely from the segment into a disengaging zone 14. The downflowing liquid then passes over a sloped bottom segment 15 of the downcomer onto the top of plate 3 below the height of the liquid level on plate 3.

The segregated vapors flow from disengaging zone 14 through spouts or openings 16 into the area above plate 2, above the height of the liquid level maintained on plate 2. In a similar manner, the liquid phase flows across plate 3; flows over the weir 11 and into a disengaging zone 17. Vapor is segregated in zone 17 and passes into the area above plate 3 by means of spouts or equivalent ports 18 above the height of the liquid phase maintained on plate 3. The downflowing liquid then flows over the lower segment 19 of the downcomer onto the plate below plate 3. As pointed out heretofore, Figure 2 comprises a top view of plate 2 showing spouts or ports 16, weir 12 and other elements.

Referring specifically to Figure 3, a fractionating zone 20 is shown containing bubble cap trays 21 and 22. Plates 21 and 22 contain chimneys 23 and 24 and bubble caps 25 and 26 respectively. In accordance with the present invention, vapors flow upwardly through chimneys 23 and 24 around the bell caps 25 and 26 onto a liquid phase maintained on the top of plates 21 and 22. The height of the liquid phase is determined by the height of weirs 27 and 28. In accordance with the present invention weirs 27 and 28 comprise a quieting zone secured by having an extended horizontal flat surface over which the downflowing liquid flows rather than over a relatively sharp edge. Thus, in accordance with the present invention, the liquid flows over weirs 27 and 28 into disengaging zones 30 and 31 comprising integral parts of downcomers 32 and 33 in a manner as described with respect to Figure 1. Disengaged vapors are removed from disengaging zone 30 by means of vent 34 while disengaged vapors are removed from disengaging zone 31 by means of line 35.

The present invention is broadly concerned with a process for increasing the efficiency of a countercurrent vapor-liquid treating zone. Usually liquid which flows across the overflow weir into the downcomer of fractionating towers contains an excessive amount of foam and entrained vapors and also mechanically carries vapor into the downcomer, both of which lower the liquid density in the downcomer and reduce its capacity to handle the flowing liquid. The flow capacity of a downcomer is a significant factor affecting overall tower capacity. It is recognized that any device or method which will increase downcomer capacity can be utilized to increase tower capacity as well.

The present invention is concerned with a process and apparatus which provides a means of removing the vapor having entered the downcomer and in addition provides a quieting zone at the downcomer entrance which reduces the amount of vapor which enters the downcomer. These two characteristics greatly increase the density of the downcomer liquid and increase its flow capacity. In addition the device greatly improves the operating stability of the tower by eliminating vapor surges up through the downcomer liquid. It is also effective in reducing the amount of vapor carried by the downcomer into the next lower section of the tower.

The process and apparatus consists essentially of a chamber connected to the back of the downcomer, immediately below a bubble cap tray. This chamber is open to the downcomer and is vented to the vapor space above the tray for removal of vapors from the downcomer. The top of the chamber provides a relatively long section which unlike conventional overflow weirs provides a quieting zone where some of the vapor is released.

The invention may be adapted to all types of fractionating towers. In existing towers, its use may be expected to increase capacity and operational stability and in new designs, its use will permit a more economical size relationship between trays and downcomers. The dimensions of the disengaging zone may vary appreciably, generally, it is preferred that it be in length about one-third of the tray's spacing. Other dimensions may vary appreciably and will depend upon the actual fractionating operation being conducted. For instance if the diameter of the fractionating tower is 9½ ft., the over all length of the weir will be from 5 to 7 ft. Suitable size vents for passing the disengaged vapors from the disengaging zone to a point above the height of the liquid level under these conditions would be from about 3 to 5 inches. The number of vents could vary appreciably, as for example from 2 to 6 or 8 or more. The height of these vents should extend above the height of the liquid. Satisfactory heights are in the range from 9 inches to lengths which approach the tray above. If a quieting zone be employed rather than a sharp edge, the width of the quieting zone over which the liquid flows before entering the downcomer may be from 1 to 6 inches. Preferred widths are from 3 to 6 inches.

Having described the invention, it is claimed:

1. In a multi-stage countercurrent vapor-liquid contacting apparatus, including a series of superposed horizontal contacting plates disposed in vertically spaced relation one to another, a means for passing liquid downwardly from plate to plate, comprising a downcomer conduit having an inlet at a level vertically spaced above a first plate and extending downwardly therefrom to an outlet vertically spaced above a second plate next below, a conduit portion of enlarged cross section at the inlet end of said downcomer conduit and substantially separated therefrom to form an enclosed chamber opening downwardly into the downcomer conduit, intermediate said downcomer inlet and outlet and a vent pipe having an inlet end opening from said chamber, and an outlet end terminating in vertically spaced relation to said first plate above the inlet of said downcomer conduit.

2. An apparatus according to claim 1, in which said enlarged downcomer conduit portion extends from said downcomer conduit outwardly under said first plate, and in which said plate is the upper end of said enclosed chamber.

3. An apparatus according to claim 1, in which said enlarged portion extends upwardly through and vertically beyond said first plate, the upper end of said enclosed chamber providing a substantially flat surface extension of said downcomer conduit inlet.

4. In a vapor-liquid contacting apparatus of the character described, including a contacting vessel, and a series of superposed contacting plates disposed transversely of said vessel in vertically spaced relation one to another, and in which each plate, with a wall of said vessel provides a segmental passageway from plate to plate, a downcomer formed in said passageway, comprising a baffle member joined to said plate chordally of said passageway, said baffle extending vertically upward above said plate and angularly downward therefrom toward the vessel wall, a substantially L-shaped partition member secured to and dependent from the under surface of said plate by its upright arm and in parallel spaced and coextensive relation to said baffle, the base arm extending toward said wall below said baffle member, an extension of said base arm extending angularly downward from said base arm into vertically spaced relation to the surface of a contacting plate next below, said L-shaped partition and the baffle member forming with said plate a substantially enclosed chamber opening downwardly toward the vessel wall, and a vent pipe having an inlet end communicating with said chamber and an outlet end opening above said plate and said baffle.

5. In a vapor-liquid contacting apparatus of the character described, including a contacting vessel, and a series of superposed contacting plates disposed transversely of the vessel in vertically spaced relation one to another, in which series each plate, with a wall of the vessel provides a segmental passageway from plate to plate, a downcomer formed in said passageway, comprising a baffle member joined to said plate chordally of said passageway, said baffle extending vertically upward above said plate to form a weir portion having an upper end, said baffle also extending vertically downward below said plate, angularly inward toward the wall of said vessel and then vertically downward into vertically spaced relation to the surface of a plate next below, forming an enlarged inlet portion at the upper end and a portion of reduced cross-sectional area therebelow, an inverted L-shaped partition member secured to the upper end of said baffle weir portion by the base arm of said L-shaped partition, extending therefrom toward the vessel wall with the upright arm of said L-shaped partition dependent therefrom and extending downwardly toward said baffle member, said partition member and baffle forming an enclosed chamber substantially at and above the level of said plate, opening downwardly therefrom into said downcomer, and a vent pipe having an inlet end communicating with said chamber, and an outlet end terminating in vertically spaced relation above said first plate above the inlet of said downcomer.

References Cited in the file of this patent

UNITED STATES PATENTS

| Number | Name | Date |
|---|---|---|
| 1,686,542 | Winkler et al. | Oct. 9, 1928 |
| 2,385,355 | Gerhold | Sept. 25, 1945 |
| 2,394,679 | Gerhold | Feb. 12, 1946 |
| 2,476,009 | Wessman | July 12, 1949 |